(12) United States Patent
Guiset et al.

(10) Patent No.: US 10,908,490 B2
(45) Date of Patent: Feb. 2, 2021

(54) REFLECTIVE PROJECTION SCREEN COMPRISING A VARIABLE LIGHT SCATTERING SYSTEM

(71) Applicant: Cardinal IG Company, Eden Prairie, MN (US)

(72) Inventors: Pierrick Guiset, Massy (FR); Patrick Gayout, Villemomble (FR)

(73) Assignee: Cardinal IG Company, Eden Prairie, MN (US)

( * ) Notice: Subject to any disclaimer, the term of this patent is extended or adjusted under 35 U.S.C. 154(b) by 0 days.

(21) Appl. No.: 14/406,175

(22) PCT Filed: Jun. 4, 2013

(86) PCT No.: PCT/FR2013/051267
§ 371 (c)(1),
(2) Date: Dec. 5, 2014

(87) PCT Pub. No.: WO2013/182804
PCT Pub. Date: Dec. 12, 2013

(65) Prior Publication Data
US 2015/0138628 A1     May 21, 2015

(30) Foreign Application Priority Data

Jun. 8, 2012    (FR) ..................................... 12 55373

(51) Int. Cl.
*G02F 1/29*        (2006.01)
*G03B 21/62*      (2014.01)
(Continued)

(52) U.S. Cl.
CPC ........ *G03B 21/62* (2013.01); *B32B 17/10036* (2013.01); *B32B 17/10174* (2013.01);
(Continued)

(58) Field of Classification Search
CPC .. G02B 5/0278; G02B 5/0242; G02B 5/0294; G02B 1/11; G02B 5/0236; G02B 1/14;
(Continued)

(56) References Cited

U.S. PATENT DOCUMENTS

| | | | |
|---|---|---|---|
| 3,963,324 A | 6/1976 | Fergason et al. | |
| 4,435,047 A | 3/1984 | Fergason | |

(Continued)

FOREIGN PATENT DOCUMENTS

| | | | |
|---|---|---|---|
| CN | 1350648 A | 5/2002 | |
| CN | 1381735 A | 11/2002 | |

(Continued)

OTHER PUBLICATIONS

Wikipedia page "Mirror" https://en.wikipedia.org/wiki/Mirror (Year: 2012).*

(Continued)

*Primary Examiner* — George G King
(74) *Attorney, Agent, or Firm* — Fredrikson & Byron, P.A.

(57) ABSTRACT

The invention relates to a glazing used as projection screen operating in reflection, comprising a front face, onto which the image is projected, and a rear face. The glazing comprises a variable light scattering system comprising a functional film capable of switching between a transparent state and a scattering state and a coating comprising at least one mirror layer, said coating being separated from the front face at least by the functional film.
The invention also relates to the use of a glazing as projection screen, to a projection system and to a projection method using said glazing.

17 Claims, 2 Drawing Sheets

(51) Int. Cl.
*B32B 17/10* (2006.01)
*G02F 1/137* (2006.01)
*G03B 21/60* (2014.01)
*G02F 1/1334* (2006.01)

(52) U.S. Cl.
CPC .. *B32B 17/10504* (2013.01); *B32B 17/10761* (2013.01); *G02F 1/137* (2013.01); *G02F 1/29* (2013.01); *G03B 21/60* (2013.01); *B32B 17/10788* (2013.01); *G02F 1/1334* (2013.01); *G02F 2001/13756* (2013.01)

(58) Field of Classification Search
CPC .... G02B 5/021; G02B 5/0221; G02B 5/0284; G02B 6/0051; G02B 1/116; G02B 5/32; G02F 1/133504; G02F 1/133553; G02F 1/133502; G02F 1/29; G02F 1/137; G02F 1/1334; G02F 2001/13756; B32B 17/10036; B32B 17/10174; B32B 17/10504; B32B 17/10761; B32B 17/10788; G03B 21/60; G03B 21/62
USPC .............. 359/318, 321, 454, 456, 460, 599, 359/601–604, 615, 449; 353/97
See application file for complete search history.

(56) References Cited

U.S. PATENT DOCUMENTS

| | | | |
|---|---|---|---|
| 4,732,456 A | 3/1988 | Fergason et al. | |
| 4,749,261 A * | 6/1988 | McLaughlin | B32B 17/10018 349/104 |
| 4,806,922 A | 2/1989 | McLaughlin et al. | |
| 5,408,353 A | 4/1995 | Nichols et al. | |
| 5,686,017 A | 11/1997 | Kobayashi et al. | |
| 5,691,795 A | 11/1997 | Doane et al. | |
| 5,958,290 A | 9/1999 | Coates et al. | |
| 6,055,088 A | 4/2000 | Fix et al. | |
| 6,072,549 A * | 6/2000 | Faris | B82Y 15/00 349/113 |
| 6,271,899 B1 | 8/2001 | Lewis et al. | |
| 6,295,102 B1 | 9/2001 | Higa et al. | |
| 6,429,961 B1 | 8/2002 | Harary et al. | |
| 6,466,298 B1 * | 10/2002 | Fix | B32B 17/10 349/16 |
| 6,572,232 B2 * | 6/2003 | Yaniv | G03B 21/26 353/88 |
| 6,661,486 B1 | 12/2003 | Faris et al. | |
| 7,342,704 B2 | 3/2008 | Yano | |
| 7,486,342 B2 * | 2/2009 | Mathey | G02F 1/133509 349/16 |
| 7,525,604 B2 | 4/2009 | Xue | |
| 7,755,829 B2 | 7/2010 | Powers et al. | |
| 7,837,897 B2 | 11/2010 | Zhang et al. | |
| 8,102,478 B2 | 1/2012 | Xue | |
| 8,187,682 B2 | 5/2012 | Albrecht et al. | |
| 2001/0033400 A1 | 10/2001 | Sutherland et al. | |
| 2003/0193709 A1 | 10/2003 | Mallya et al. | |
| 2004/0229049 A1 * | 11/2004 | Boire | B32B 17/10036 428/432 |
| 2008/0190759 A1 | 8/2008 | Valentin et al. | |
| 2009/0068455 A1 | 3/2009 | Albrecht et al. | |
| 2009/0103027 A1 | 4/2009 | Hughes et al. | |
| 2009/0219603 A1 | 9/2009 | Xue | |
| 2009/0284670 A1 * | 11/2009 | Xue | G02F 1/133536 349/16 |
| 2009/0290078 A1 | 11/2009 | Yang et al. | |
| 2010/0118380 A1 | 5/2010 | Xue | |
| 2010/0279125 A1 | 11/2010 | Buyuktanir et al. | |
| 2010/0294679 A1 | 11/2010 | Griffiths et al. | |
| 2011/0102730 A1 | 5/2011 | Lee et al. | |
| 2012/0212523 A1 | 8/2012 | Yamauchi | |
| 2013/0093969 A1 | 4/2013 | Li et al. | |
| 2015/0098037 A1 * | 4/2015 | Gayout | E06B 9/24 349/33 |

FOREIGN PATENT DOCUMENTS

| | | |
|---|---|---|
| CN | 1526085 A | 9/2004 |
| CN | 1653386 A | 8/2005 |
| CN | 1773371 A | 5/2006 |
| CN | 101339309 A | 1/2009 |
| CN | 102341752 A | 2/2012 |
| EP | 0088126 A1 | 9/1983 |
| EP | 0238164 A1 | 9/1987 |
| EP | 0268877 A2 | 6/1988 |
| EP | 0357234 A2 | 3/1990 |
| EP | 0409442 A2 | 1/1991 |
| EP | 0823653 A1 | 2/1998 |
| EP | 0825478 A1 | 2/1998 |
| EP | 0964288 A2 | 12/1999 |
| EP | 2128688 A1 | 12/2009 |
| EP | 2256545 A1 | 12/2010 |
| JP | H05-088143 A | 4/1993 |
| JP | H05-241242 A | 9/1993 |
| JP | 2005010481 A | 1/2005 |
| JP | 2005024763 A | 1/2005 |
| JP | 2007133187 A | 5/2007 |
| JP | 2007525710 A | 9/2007 |
| JP | 2008542804 A | 11/2008 |
| JP | 2011175110 A | 9/2011 |
| JP | 2012030980 A | 2/2012 |
| JP | 2012103659 A | 5/2012 |
| KR | 1020060082932 A | 7/2006 |
| KR | 1020120045915 A | 5/2012 |
| WO | 9219695 A2 | 11/1992 |
| WO | 2004021079 A1 | 3/2004 |
| WO | 2011075796 A1 | 6/2011 |
| WO | 2011161391 A1 | 12/2011 |
| WO | 2012060306 A1 | 5/2012 |

OTHER PUBLICATIONS

Chen et al., "Electro-Optical Properties of Polymer Stabilized Cholesteric Texture Normal-Mode Light Shutter From Flexible Monomers," ALCOM Tech Report XI, 2000, pp. 223-229.

"Liquid Crystal Glass," retrieved from http://www.glazette.com/Glass-Knowledge-Bank-70/Liquid-Crystal-Glass.html on Oct. 1, 2013, 2 pages.

"Switchable Intelligent Glass—SGG Priva-lite Electrochromatic Glass," Saint Gobain Glass India, retrieved from http://in.saint-gobain-glass.com/b2c/default.asp?nav1=pr&nav2=single%20pane&id=18978 on Oct. 1, 2013, 1 page.

"Transparent Display," Kent Optronics, retrieved from http://kentoptronics.com/transparent.html on Oct. 1, 2013, 1 page.

International Search Report and English translation for International Application No. PCT/FR2013/051267, dated Sep. 11, 2013, 6 pages.

* cited by examiner

A

B  C  D

F  G

H  I

REFLECTIVE PROJECTION SCREEN COMPRISING A VARIABLE LIGHT SCATTERING SYSTEM

CROSS-REFERENCE

This application is a 35 U.S.C. 371 national stage filing from International Application No. PCT/FR2013/051267, filed Jun. 4, 2013 and claims priority to France Application No. 1255373 filed Jun. 8, 2012. The entire contents of these applications are incorporated herein by reference.

The invention relates to a glazing used as projection screen operating in reflection comprising a variable light scattering system. The invention also relates to the use of a glazing as projection screen, to a projection system and to a projection method using said glazing.

The invention relates more particularly to projection screens which make possible the viewing of an image on one face of the screen, it being possible for this image to result from a projector or more generally from a light source positioned facing said face of the screen. A projection screen comprises two faces. The main face, or front face, corresponds to that onto which is projected the image originating from the light source positioned in the same region of space as the light source. For its part, the opposite face corresponds to that on which possibly appears, by transparency, the image projected onto the main face. In this embodiment, the spectators are found on the side of the projector.

Back-projection screens have a main face and an opposite face having the same characteristics as those of the above-mentioned projection screens. On the other hand, a back-projection screen differs from the projection screens in that the user and the light source are not located in the same region of space but occur on either side of the screen. Back-projection involves necessarily placing the projector behind the glazing and thus having available a chamber at this spot. This configuration is thus restricting in the space which it requires for its use.

One of the solutions proposed for improving the performance of standard transparent glazings used as projection screen consists in using glazings which can switch between a transparent state and a scattering state. These glazings are based on the use of a functional film comprising active elements placed between two electrode-carrying supports. The active elements, when the film is placed under voltage, become oriented along a favored axis, which allows viewing through the functional film. Without voltage, in the absence of alignment of the active elements, the film becomes scattering and prevents viewing.

Such glazings are currently used mainly as screen for the back-projection of images in the scattering state as their properties do not allow them to be suitably used as projection screen. This is because direct image projection onto a switchable glazing, for example comprising liquid crystals, is of mediocre quality due to the unsuitable optical properties of these glazings, such as the low diffuse reflection and the high light transmission. The low diffuse reflection has the consequence of weakening the luminance and thus the contrast of the image. This weakening renders the use of such glazings awkward as projection screen when they are looked at with small angles. However, in particular, the luminance of the images projected onto these glazings strongly decreases when the angle of observation increases. The problem of the low angle of view coupled with that of the low diffuse reflection makes it difficult to use such glazings as projection screen when they are looked at with large angles of observation.

Another solution, provided in particular in patent application EP 0 823 653, consists of a glazing combining a variable light transmission/absorption system and a variable light scattering system. This glazing can be used as back-projection or projection screen. However, it is clearly indicated that these systems are relatively satisfactory in back-projection but do not function correctly in projection. Image projection in reflection is of mediocre quality with here again a low luminance, a low contrast and a low angle of view, this being the case, a fortiori, when the projection is carried out in an undarkened chamber. Finally, image projection is only possible in the scattering state. In the transparent state, direct projection is impossible.

Finally, the patent application EP 0 825 478 describes glazings combining an active system having variable optical and/or energy properties which can be a variable light scattering system and a thermal protection means. The thermal protection means comprises a coating having a reflection property in the infrared region and/or in the visible region and/or in the ultraviolet region. The use of such a glazing as projection or back-projection screen is not envisaged in this document. In addition, the only two examples illustrating a glazing comprising a variable light scattering system and a semireflecting layer exhibit light transmission and light reflection values, measured on the side of the glazing in contact with the variable light scattering system, which are not suitable for use as projection screen. This is because the light transmission is too high or the light reflection is too low. Furthermore, the quality of the mirror always remains inferior to that of a standard mirror, in particular in terms of reflected light and thus of contrast.

The use of these glazings, for example comprising a variable light scattering system provided with a semireflecting layer, is relatively restricting. This is because, in order to switch between a "mirror" state and an acceptable transparency, this product requires suitable luminous environments on either side of the glazing in terms of directivity and level of illumination, and also a system for controlling the luminous environments. These luminous environments have in particular to be in phase with the switching of the product, which requires:

a switchable artificial lighting solution (for example, lights based on light-emitting diodes (LEDs) actuated by a switch or person detector), a switchable artificial and/or natural lighting solution at the rhythm of day/night sunshine, the choice of a semireflecting layer having a transmission/reflection pair suitable for a given luminous environment.

The present invention is targeted at providing a glazing having variable optical properties which can switch between a mirror state and a scattering state, which is very particularly suitable for use as projection screen in the scattering state. The invention is also targeted at overcoming the disadvantages of the known glazings of the prior art by providing a glazing which makes it possible in particular:

to strengthen the luminance, to strengthen or improve the contrast, to improve the angle of view, this viewing being carried out without optical defects, that is to say with an excellent uniformity of the image viewed, to prevent the projected image from appearing by transparency on the opposite face and to thus retain confidentiality, to be able to be used as projection screen, whatever the luminous environment of the room where the projection is being carried out or when the glazing is used as partition between two rooms, whatever the luminous environment in each of these two rooms.

The luminance corresponds to the intensity per unit of surface area projected orthogonally onto a plane normal to the direction under consideration (which is expressed in $Cd/m^2$). This parameter corresponds to the visual sensation of luminosity, caused by the reflection or the emission of light by a surface.

The contrast corresponds to the ratio of the maximum luminance of the image to the minimum luminance of the image, that is to say to the ratio of a white image to that of a black image.

The gain of a screen (peak gain) corresponds to the ratio, measured at one and the same point of the image and at an angle of 0°, of the luminance of the screen to the luminance of an ideal screen. An ideal screen is perfectly reflecting at every point of its surface and has an unchanging luminance, whatever the angle of observation. The glazings used as projection screen thus have to be highly reflecting. A screen having a gain of greater than 1 generally returns more light at small angles than at large angles. In general, the luminance of a screen decreases when the angle of observation increases. Consequently, a high gain screen exhibits a high luminosity at a low angle of observation and thus a reduced angle of view. A low gain screen exhibits a luminosity which is less dependent on the angle of observation and thus a high angle of view.

According to the invention, the angle of view corresponds to twice the angle of observation for which the luminance of the screen or its gain has fallen by 50% (or ½ gain or half gain angle).

The invention thus relates to a glazing, said glazing comprising a front face and a rear face, characterized in that said glazing comprises:
  a variable light scattering system comprising a functional film capable of switching between a transparent state and a scattering state,
  a coating comprising at least one mirror layer, said coating being separated from the front face at least by the functional film,
said glazing exhibits:
  a light transmission LT of less than 20%,
  a light reflection LR of greater than 25%.

Said glazing can be used as projection screen operating in reflection, said glazing comprising a front face, onto which the image is projected, and a rear face, characterized in that said glazing comprises:
  a variable light scattering system comprising a functional film capable of switching between a transparent state and a scattering state,
  a coating comprising at least one mirror layer, said coating been separated from the front face at least by the functional film,
said glazing exhibits:
  a light transmission LT of less than 20%,
  a light reflection LR of greater than 25%.

The invention also relates to the use of a glazing as projection screen operating in reflection.

The invention also relates to a method for projection in reflection according to which a projection screen operating in reflection and a projector are available, said method consisting in projecting images, by virtue of the projector, onto the projection screen comprising a glazing according to the invention.

The glazing of the invention is capable of switching between:
  a mirror state viewable on both faces of said glazing when the functional film is rendered transparent,
  a mirror state on the rear face of the glazing and a scattering state on the front face of the glazing when the functional film is rendered scattering.

Throughout the description, the glazing according to the invention is regarded as positioned vertically with a first face or rear face, directed toward the left, defining a main external surface S1 and a second face or front face, opposite the first face, directed toward the right, defining a main external surface S2. The meanings of the expressions "front" and "rear" are thus to be regarded with respect to this orientation. Arbitrarily, the rear face of the glazing is regarded as the face of the glazing separated from the functional film of the variable light scattering system by the mirror layer and the front face of the glazing is regarded as the face of the glazing separated from the mirror layer by the functional film. The surface S2 thus delimits the main face of the screen and also the side onto which an image originating from a light source is projected. The surface S1 delimits the opposite face of the screen. The projector and the observer are located facing the front face.

The glazing preferably comprises an electrically controllable variable light scattering system. These systems comprise a functional film, capable of switching between a transparent state and a scattering state, framed by two front and rear electrode-carrying supports which are preferably transparent. The electrodes each comprise at least one electrically conducting layer and are directly in contact with the functional film. The functional film comprises active elements, the orientation of which is modified by application of an electric or magnetic field.

These electrically controllable variable light scattering systems comprise, for example, liquid-crystal systems.

According to the invention, the term "ON state" is understood to mean the transparent state of the functional film when the glazing is under voltage and the term "OFF state" is understood to mean the scattering state of the functional film when the glazing is no longer under voltage. The active elements, when the film is placed under voltage, become oriented along a favored axis, which makes it possible for a radiation to be transmitted and thus allows viewing through the functional film.

Insofar as a coating comprising a mirror layer is juxtaposed in the variable light scattering system, when viewing is rendered possible, the mirror layer is then seen through the functional film. A "mirror" state is thus observed on the front and rear faces of the glazing in the ON state.

Without voltage, in the absence of alignment of the active elements, the film becomes scattering and prevents the direct viewing of the mirror layer. Consequently, a perfect mirror is observed on the rear face of the glazing and a scattering layer is observed on the front face of the mirror. The glazing can then be used as projection screen on the scattering front face.

The active elements of the functional film switch reversibly from a translucent state to a transparent state by application of an electric field. The electric field applied is preferably alternating.

The combination of a mirror layer and of a variable light scattering system makes it possible to switch, on the front face, between a mirror state and a scattering state exhibiting a very low light transmission. The projection screen comprising a scattering front face exhibits a good luminosity, a high contrast and a greater angle of view, in comparison with a glazing comprising only a variable light scattering system.

The quality of the mirror is that of a standard mirror. It is thus of very good quality, more particularly on the rear face of the glazing. The rear face is in the mirror state, whatever the state of the variable light scattering system.

The glazing of the invention can thus be used in the ON state in an internal partition as mirror on both sides in order to structure a space and in the OFF state in order to structure a space with a mirror face and a scattering face suitable as projection screen.

According to the invention, it is possible to project images in illuminated environments, whereas this could not be envisaged for the glazings comprising variable light scattering systems, for example comprising liquid crystals, of the prior art.

Furthermore, the quality of the images projected is very greatly improved, in particular the contrast. The restitution of the colors and of the hues of the projected images is retained by virtue of the color neutrality of the screen. These properties are obtained without harming the "mirror" functionality of the glazing when the functional film is in the transparent state. The invention makes it possible not only to improve the image in projection in the scattering state but also to retain the appearance of the glazing in its mirror state.

The quality of the screen depends on the transmission and reflection properties of the glazing. The lower the light transmission, the greater the light reflection, the better the quality of the screen and the better the quality of the mirror. For example, an image reflected on a mirror exhibiting a high reflection and a low transmission will be more luminous.

The invention thus makes it possible, in comparison with a glazing comprising only a variable light scattering system:
  to improve the luminance of white measured in cd/m$^2$,
  to improve the contrast and thus the quality of the projection, whatever the lighting conditions (semidarkness or illuminated room), in particular:
    when the projection screen is used in a projection room, the level of illumination can be from a few lux to 800 lux,
    when the projection screen is used as wall or partition between two rooms, a projection room and a related room, the level of illumination in the related room can be high and in particular greater than 300 lux,
  to improve the angle of view and to consequently make possible good viewing and readability of the image.

According to specific embodiments, the glazing according to the invention additionally comprises one or more of the technical characteristics below, taken in isolation or according to all the combinations technically possible:
  it exhibits a light transmission LT of less than 5% and/or a measured light reflection of greater than 50%,
  the mirror layer is a metallic layer or a layer comprising a metal nitride preferably comprising at least one metal chosen from the group consisting of silver (Ag), aluminum (Al), titanium (Ti), gold (Au), nickel (Ni), chromium (Cr), copper (Cu), rhodium (Rh), platinum (Pt), palladium (Pd), cobalt (Co), manganese (Mn), molybdenum (Mo), tungsten (W), hafnium (Hf), niobium (Nb), iron (Fe) and tantalum (Ta), including alloys of these,
  the mirror layer is chosen from the group consisting of a layer of silver, chromium, niobium, niobium nitride, steel, preferably stainless steel, and alloys predominately comprising (by weight) silver, chromium, iron or niobium,
  the mirror layer exhibits a thickness of greater than 50 nm, preferably of between 50 and 80 nm,
  the mirror layer is placed inside the glazing,
  the mirror layer is the electrically conducting layer of the rear electrode,
  the glazing exhibits an angle of view of greater than 20°, preferably of greater than 25°,
  the front and rear faces of the glazing are smooth.

The dimensions of the glazing used as projection screen according to the invention can vary within a wide range. The glazing can in particular have a height and/or a width from a few centimeters to several meters, in particular of at least 50 cm, of at least 1 m, of at least 2 m, of at least 4 m, of at least 10 m.

Another subject matter of the invention is a projection system comprising a glazing used as projection screen as defined in the present patent application and a projector. The glazing is arranged so that the incident light originating from the projector arrives on the functional film before arriving and being reflected on the mirror layer.

According to the invention, the glazing comprises a coating comprising at least one mirror layer. The term "mirror layer" is understood to mean a layer which exhibits a high reflecting function and a low light transmission. A mirror layer is a layer which reflects light specularly.

The photometric properties of the glazing used according to the invention depend on the photometric properties of the mirror layer, in particular on the light transmission and on the light reflection of this layer. This is because, due to the presence of this mirror layer, the glazing incorporating it cannot have higher transmission values. Preferably, the mirror layer or the glazing exhibits, by increasing order of preference:
  a light transmission LT which is less than or equal to 20%, less than or equal to 15%, less than or equal to 10%, less than or equal to 8%, less than or equal to 5%, less than or equal to 3%, less than or equal to 1%, less than or equal to 0.1%,
  a light reflection LR which is greater than or equal to 25%, greater than or equal to 35%, greater than or equal to 45%, greater than or equal to 55%, greater than or equal to 65%, greater than or equal to 75%, greater than or equal to 85%, greater than or equal to 90%.

The light transmission LT and the light reflection LR are measured according to the standard ISO 9050: 2003 (illuminant D65, 2° observer). The light reflection is measured in the ON and/or OFF state on the front face and/or rear face side. Preferably, the light reflection is measured on the front face side in the ON state.

The mirror layer can be a metallic layer or a layer comprising a metal nitride preferably comprising at least one metal chosen from silver (Ag), aluminum (Al), titanium (Ti), gold (Au), nickel (Ni), chromium (Cr), copper (Cu), rhodium (Rh), platinum (Pt), palladium (Pd), cobalt (Co), manganese (Mn), molybdenum (Mo), tungsten (W), hafnium (Hf), niobium (Nb), iron and tantalum (Ta), including alloys of these. Examples of alloys suitable according to the invention include chromium-aluminum, aluminum-silicon, chromium-silicon, aluminum-titanium and aluminum-tantalum binary alloys and three-component alloys, such as the Cr—Al—Si alloy, and also steel (iron-carbon alloy) and stainless steel (iron-carbon-chromium alloy).

Preferably, the mirror layer is a metallic layer and/or a layer comprising a metal nitride chosen from a layer of silver, chromium, niobium, niobium nitride, steel, preferably stainless steel, or alloy predominately comprising silver, chromium, iron or niobium.

Particularly preferably, the metallic layer is a chromium-based layer. These layers are advantageously not detrimentally affected by a humid atmosphere, in contrast to silver-based metallic layers. A mirror layer comprising a chromium-based metallic layer typically exhibits a light reflection of greater than 55%, of the order of 60%, and a light transmission of less than 5%, of the order of 3%.

The metallic layer or the layer comprising a metal nitride has a sufficient thickness to confer, on the glazing incorporating it, the required light transmission and reflection properties. For example, the light reflection by a layer of silver reaches a maximum value for a thickness of at least 60 nm. The light transmission by a layer of silver is zero for thicknesses of at least 100 nm.

The metallic layer or the layer comprising a metal nitride exhibits, by increasing order of preference:
- a thickness of greater than or equal to 10 nm, of greater than or equal to 15 nm, of greater than or equal to 20 nm, of greater than or equal to 25 nm, of greater than or equal to 30 nm, of greater than or equal to 40 nm, of greater than or equal to 50 nm,
- a thickness of less than or equal to 1 µm, of less than or equal to 500 nm, of less than or equal to 200 nm, of less than or equal to 100 nm, of less than or equal to 80 nm.

Preferably, when the layer is a layer of silver or chromium, it exhibits, by increasing order of preference, a thickness of greater than or equal to 15 nm, of greater than or equal to 20 nm, of greater than or equal to 30 nm, of greater than or equal to 40 nm, of greater than or equal to 50 nm.

Preferably, when the layer is a layer of niobium or niobium nitride, it exhibits, by increasing order of preference, a thickness of greater than or equal to 25 nm, of greater than or equal to 30 nm, of greater than or equal to 40 nm, of greater than or equal to 50 nm.

According to the invention, the coating comprising the mirror layer can comprise a stack of layers comprising the mirror layer and one or more underlayers and/or overcoats. These underlayers and/or overcoats are used to adjust varied properties, such as the color, the durability and the chemical resistance. The choice of the nature and thicknesses of these underlayers or overcoats is made so as not to detrimentally affect the light reflection and transmission properties of the mirror layer.

These underlayers and overcoats can comprise oxides and/or nitrides of metals or semimetals, preferably chosen from titanium, tin, zinc, silicon, aluminum and zirconium.

Mention may be made, as oxides or nitrides of metals or semimetals, of silica ($SiO_2$), aluminum oxide ($Al_2O_3$), titanium oxide ($TiO_2$), tin oxide ($SnO_2$), tin zinc mixed oxide ($SnZnO_x$), oxynitrides, such as silicon oxynitride SiON, or nitrides, such as silicon nitride $Si_3N_4$, aluminum nitride AlN or silicon zirconium nitride ($SiZrN_x$). These overcoats and underlayers preferably have a thickness of less than 150 nm.

The coating comprising the mirror layer can be obtained by any known method which makes possible the deposition of layers as defined above. Mention may in particular be made of magnetic-field assisted cathode sputtering, evaporation, the sol-gel technique and vapor phase deposition (CVD) techniques. Preferably, the layers or coatings are produced by cathode sputtering.

The coating comprising the mirror layer is preferably deposited on one of the faces of a substrate. A stack comprising a chromium-based metallic layer can be that used in the Mirastar® product sold by Saint-Gobain Glass. A stack comprising a silver-based metallic layer can be that used in the Miralite® product sold by Saint-Gobain Glass.

Use may be made, as electrically controllable variable light scattering system, of a liquid-crystal system.

The electrically controllable variable light scattering systems having liquid crystals comprise a functional film comprising liquid crystals. These liquid-crystal systems reversibly switch, by application of an electric field, from a transparent state to a nontransparent state. The functional film preferably comprises a polymeric material in which droplets of liquid crystals, in particular nematic liquid crystals having a positive dielectric anisotropy, are dispersed.

The liquid crystals used for glazing applications preferably come within the family of the calamitic liquid crystals. This family of liquid crystals is generally divided into three groups: nematic, cholesteric and smectic.

For large-surface-area applications, the terms used are generally dispersed liquid crystals (PDLC, Polymer-Dispersed Liquid Crystals) and encapsulated liquid crystals (NCAP, Nematic Curvilinear Aligned Phase), in particular those used in Priva-Lite® glazings. These systems result from nematic liquid crystals enclosed in microcavities. The NCAP films are generally prepared starting from an emulsion, while the PDLC films generally result from an isotropic solution which forms separate phases during the drying.

Use may also be made, according to the invention, of liquid crystals of CLC ("Cholesteric Liquid Crystal") or NPD-LCD ("Non-homogeneous Polymer Dispersed Liquid Crystal Display") type.

Use may also be made, for example, of a layer comprising a gel based on cholesteric liquid crystals comprising a small amount of crosslinked polymer, such as those described in the patent WO-92/19695, or liquid crystals which switch with variation in light transmission LT. More broadly, the choice may thus be made of PSCT ("Polymer Stabilized Cholesteric Texture") products.

Use may also be made of bistable liquid crystals, such as described in the patent EP 2 256 545, which switch under the application of an alternating electric field in the pulsed form and which remain in the switched state until the application of a fresh pulse.

The functional film comprising the liquid crystals preferably has a thickness of between 3 and 100 µm, preferably of between 3 and 50 µm and better still of between 3 and 30 µm.

The functional film can comprise a polymer film in which liquid crystals are dispersed as active elements or a layer of liquid crystals. The polymer film can be a crosslinked polymer film in which the liquid crystals are dispersed or an emulsion of liquid crystals in a medium. The liquid crystals known under the terms of NCAP, PDLC, CLC and NPD-LCD can be used.

The functional film can be a polymer film which comprises, as active elements, liquid crystals dispersed in the form of droplets in an appropriate medium. The liquid crystals can be nematic liquid crystals having a positive dielectric anisotropy, such as liquid crystals of the NCAP or PDLC type. Examples of liquid-crystal functional film are described in particular in the European patents EP-88 126, EP-268 877, EP-238 164, EP-357 234, EP-409 442 and EP-964 288 and the U.S. Pat. Nos. 4,435,047, 4,806,922 and 4,732,456.

These polymer films can be obtained by evaporation of the water present in an aqueous emulsion of liquid crystals and of a medium comprising a water-soluble polymer.

The medium is preferably based on a polymer of the family of the latexes of polyurethane (PU) type and/or on a polymer of polyvinyl alcohol (PVA) type generally prepared in the aqueous phase in a proportion of polymers of 15% to 50% by weight, with respect to the water.

As a general rule, the birefringence of the liquid crystals is between 0.1 and 0.2 and varies in particular as a function of the medium used. Their birefringence is of the order of 0.1, if the polymer of the medium is of polyurethane (PU) type, and of the order of 0.2, if it is of polyvinyl alcohol (PVA) type.

The elements active with regard to light scattering are advantageously in the form of droplets having a mean diameter of between 0.5 and 3 µm, in particular between 1 and 2.5 µm, dispersed in the medium. The size of the droplets depends on a certain number of parameters, including in particular the emulsifiability of the active elements in the medium under consideration. Preferably, these droplets represent between 120% and 220% by weight of the medium, in particular between 150% and 200% by weight, excluding the solvent, generally aqueous, of said medium.

Particularly preferably, the choice is made of liquid crystals in the form of droplets having a diameter of approximately 2.5 µm, when the medium is based on polyurethane latex (birefringence of approximately 0.1), and having a diameter of approximately 1 µm, when the medium is instead based on polyvinyl alcohol (birefringence of approximately 0.2).

A functional film comprising a liquid emulsion of nematic liquid crystals preferably comprises a thickness of approximately 10 to 30 µm, better still of 20 to 25 µm.

This type of film, once laminated and incorporated between two substrates, is sold by Saint-Gobain Glass under the Priva-Lite® trade name.

A polymer film comprising a crosslinked polymer film in which the liquid crystals are dispersed can be obtained by preparation of a mixture comprising liquid crystals, monomers and preferably a polymerization initiator, followed by the crosslinking of the monomers. The liquid crystals which can be used are known in particular under the terms of NCAP, PDLC, CLC and NPD-LCD.

The polymer film comprising the liquid crystals can comprise compounds, such as the compound 4-((4-ethyl-2, 6-difluorophenyl)ethynyl)-4'-propylbiphenyl and 2-fluoro-4,4'-bis(trans-4-propylcyclohexyl)biphenyl, for example sold by Merck under the reference MDA-00-3506.

The polymer film can comprise the known compounds described in the document U.S. Pat. No. 5,691,795. Mention may be made, as liquid crystals suitable according to the invention, of the product from Merck Co. Ltd sold under the trade name "E-31 LV", which corresponds to a mixture of several liquid crystal compounds. Preferably, use is made of a mixture of this product with a chiral substance, for example 4-cyano-4'-(2-methylbutyl)biphenyl, a monomer, for example 4,4'-bisacryloylbiphenyl, and a UV photoinitiator, for example benzoin methyl ether (CAS No. 3524-62-7). This mixture is applied in the layer form in contact with the electrode. After crosslinking or polymerization of the active mixture comprising the liquid crystals by irradiation with UV light, a polymer network is formed in which the liquid crystals are incorporated.

A polymer film comprising a polymer network in which the liquid crystals are incorporated can have a thickness ranging from 3 to 100 µm, preferably from 3 to 60 µm and better still from 3 to 20 µm.

According to another embodiment, the functional film can comprise a layer of liquid crystals. The layer of liquid crystals preferably comprises, as active elements, liquid crystals known under the terms of NCAP, PDLC, CLC and NPD-LCD.

This layer of liquid crystals can comprise liquid crystals and spacers. The spacers can be made of glass or of plastic, preferably hard plastic, for example made of polymethyl methacrylate (PMMA). These spacers are preferably transparent and/or nonconducting and/or exhibit an optical index which is substantially equal to the optical index of the matrix of the layer of liquid crystals. The spacers are, for example, in the form of beads or ovals.

The layer of liquid crystals does not necessarily comprise polymer constituting a medium or a network. This layer can be composed solely of the liquid crystals and spacers. The liquid crystals are applied (without additional monomer) over a thickness of 3 to 60 µm, preferably of 3 to 20 µm, in contact with the electrode. Compounds suitable for this embodiment are described, for example, in the document U.S. Pat. No. 3,963,324. According to this embodiment, the thickness of the layer of liquid crystals can be between 10 and 30 µm, preferably 10 and 20 µm.

The layer of liquid crystals can have a thickness ranging from 3 to 100 µm, preferably from 3 to 60 µm and better still from 3 to 20 µm.

The functional film is framed by two electrodes themselves framed by two supports, the electrodes being in direct contact with the functional film. The assembly formed by an electrode and a support corresponds to an electrode-carrying support or to a self-supported electrode.

The electrodes each comprise at least one electrically conducting layer. The electrically conducting layer can comprise transparent conductive oxides (TCOs), that is to say materials which are both good conductors and transparent in the visible region, such as indium tin oxide (ITO), $In_2O_3$, antimony-doped $SnO_2$, fluorine-doped $SnO_2$ ($SnO_2$:F) or aluminum-doped ZnO (ZnO:Al). An electrically conducting layer based on ITO (tin-doped indium oxide) exhibits a resistance of approximately 100 ohms per square.

The electrically conducting layer can also comprise transparent conductive polymers which are organic compounds comprising conjugated double bonds, the conductivity of which can be improved by chemical or electrochemical doping.

These electrically conducting layers based on conductive oxides or conductive polymers are preferably deposited over thicknesses of the order of 50 to 100 nm.

The electrically conducting layer can also be a metallic layer, for example made of Ag, Al, Pd, Cu, Pt, In, Mo or Au. The electrically conducting metallic layer can be a thin layer, referred to as TCC (Transparent Conductive Coating), preferably exhibiting a thickness of between 2 and 50 nm. An electrically conducting layer acting as electrode can be deposited on a face of a support and thus form an electrode-carrying support. An electrically conducting layer acting as electrode can also be deposited directly on the functional film. When an electrically conducting layer is deposited on the functional film, a support is subsequently assembled in contact with the electrode so as to form the electrode-carrying support. These layers can be deposited by a large number of known techniques, such as magnetic-field assisted cathode sputtering, evaporation, the sol-gel technique and vapor phase deposition (CVD) techniques.

The electrodes comprising an electrically conducting layer are connected to an energy supply. The energy supply can be an electrical supply using voltages of between 0 and 110 V.

The supports can be supple, flexible or rigid and chosen in particular from substrates made of glass or polymer and inserts or sheets made of thermoformable or pressure-sensitive plastic.

These supports can thus be glass substrates or sheets, for example flat float glass sheets or polished glass sheets. The thickness of the glass sheets or substrates is generally between 0.5 mm and 10 mm.

The plastics making up the inserts or sheets include polyurethane (PU), ethylene/vinyl acetate (EVA) copolymers, polyvinyl butyral (PVB), copolymers of polyethylene and acrylate, or polyethylene terephthalate (PET). Use may also be made, as other plastics, of polyolefins, such as polyethylene (PE) and polypropylene (PP); polyesters, such as polyethylene terephthalate (PET) and polyethylene naphthalate (PEN); polyvinyl chloride (PVC) or ionomer resins.

The sheets made of polyurethane (PU), of ethylene/vinyl acetate (EVA) copolymers or of polyvinyl butyral (PVB) have, for example, a thickness preferably of between 0.1 mm and 2 mm.

The PET sheets have, for example, a thickness of between 50 µm and 1 mm, preferably of between 100 and 500 µm, better still of between 150 and 200 µm, in particular of approximately 175 µm.

The variable light scattering system comprising the functional film can extend substantially over the entire surface of the glazing or over at least a portion of the glazing. Preferably, the liquid-crystal system extends over the entire surface of the glazing.

The glazing can comprise one or more other supports as described above, front or rear, not carrying electrodes.

According to the invention, the term "internal face" is understood to mean the face of a support constituting the glazing which is facing the functional film, that is to say the face of the support closest to the functional film, and the term "external face" is understood to mean the opposite face, that is to say the face of the support which is furthest from the functional film.

The coating comprising at least one mirror layer can be formed directly on a support, preferably a glass substrate. However, in an alternative form, one or more intermediate layers can be interposed.

According to one embodiment, the glazing comprises the following stack:
  a transparent rear substrate made of flat glass, for example a glass sheet,
  an insert made of plastic, in particular thermoplastic, of PVB or EVA type,
  a variable light scattering system comprising a functional film framed by two electrode-carrying supports, said electrodes being directly in contact with the functional film,
  an insert made of plastic, in particular thermoplastic, in particular of the type of the first,
  a transparent front substrate made of flat glass.

According to this embodiment, the variable light scattering system preferably comprises two electrode-carrying supports composed of a polyethylene terephthalate (PET) sheet covered with an electrically conducting layer of tin-doped indium oxide (ITO) framing a functional film. A variable light scattering system of this type is used in the Priva-Lite® glazings from Saint-Gobain Glass. The laminating inserts make it possible to attach the front and rear substrates with the electrode-carrying supports. A glazing of this type corresponds to the configuration used in the Priva-Lite® glazings from Saint-Gobain Glass.

According to another embodiment, the glazing comprises the following stack:
  a transparent rear substrate made of flat glass,
  a plastic insert,
  a variable light scattering system comprising a functional film framed by two electrode-carrying supports, said electrodes being directly in contact with the functional film.

According to this embodiment, the variable light scattering system comprises two electrode-carrying supports comprising flat float glass sheets comprising an electrode framing a functional film preferably comprising a layer of liquid crystals.

Preferably, use is made of a glass sheet exhibiting a thickness of at least 3 mm, when the thickness of the functional film is less than 30 µm, and a glass sheet exhibiting a thickness of at least 2 mm, when the thickness of the functional film is greater than or equal to 30 µm.

The coating comprising at least one mirror layer can be deposited:
  on the external face of a rear support or substrate, and/or
  on the internal face of a rear support or substrate, and/or
  on the external surface of the rear electrode-carrying support, and/or
  on the internal surface of the support carrying the rear electrode.

Particularly advantageously, the coating comprising at least one mirror layer is deposited on a face located as close as possible to the functional film, that is to say on the internal face of a rear support or substrate or on the external or internal surface of the rear electrode-carrying support.

The applicant has discovered that the closer the coating comprising the mirror layer is to the functional film, the better the properties of the projection screen.

Consequently, according to one embodiment, the coating comprising the mirror layer is placed on the internal surface of the electrode-carrying support. In this configuration, the coating comprising the mirror layer can perform the role of electrode as this layer can be an electrically conducting layer.

According to this embodiment, the mirror layer can be an electrically conducting layer forming part of the rear electrode or the electrically conducting layer of the rear electrode.

The mirror layer also acting as electrically conducting layer can be a metallic layer or a layer based on conducting metal oxide or nitride. The mirror layer must have a thickness suitable for conferring, on the glazing, the properties required in terms of light transmission and reflection. Preferably, the mirror layer is a layer of silver or chromium, the thickness of which is appropriately adjusted, for example a layer of silver or chromium of approximately 70 nm exhibiting a light transmission LT of less than 3%.

According to one embodiment, the glazing of the invention can be obtained by assembling:
  a rear glass substrate comprising a mirror layer, such as a Miralite® glazing from Saint-Gobain,
  a variable light scattering system comprising a functional film framed by two electrode-carrying supports, said electrodes being directly in contact with the functional film,
  a front glass substrate.

The mirror layer is preferably deposited on the internal face of the rear substrate. This mirror layer is subsequently brought into contact with the external face of the rear electrode-carrying support. After assembling, the mirror layer is found on the inside of the glazing and not on the outside. This means that the mirror layer is not located on the rear external surface of the glazing.

The variable light scattering system and the front and/or rear substrates can be assembled by any known means, such as mechanical or chemical means. It is possible in particular to assemble them by laminating by virtue of the use of a laminating insert.

The glazings comprising a layer of liquid crystals can be prepared by bringing the electrode-carrying supports, preferably made of glass, into contact by lowering the second support, with an inclined angle, onto the first support in order to include the layer of liquid crystals. The glazing advantageously comprises a seal which will seal the front and rear electrode-carrying supports over the edges of their internal faces. The seal can be an epoxy resin. The seal can be interrupted in its width by a plurality of openings. The supports are then pressed by passing between two rolls in order to distribute the layer of liquid crystals while discharging the trapped air.

According to this embodiment, the variable scattering system comprises two electrode-carrying supports, a layer of liquid crystals and a seal. The mirror layer can be a layer of the electrode, a layer deposited on the external face of the electrode-carrying support or a layer deposited on the internal or external face of another rear support which will subsequently be assembled with the rear electrode-carrying support by adhesive bonding or laminating with an insert.

The method for the preparation of such a glazing comprising a layer of liquid crystals can comprise the following stages:
  formation of the seal, comprising the application of the sealant to a first float glass sheet possessing the first electrode, preferably along the edge,
  deposition by the liquid route of the layer of liquid crystals on the first float glass sheet possessing the first electrode and optionally on the second float glass sheet possessing the second electrode, before or after the formation of the seal,
  after the formation of the seal and the deposition of the layer of liquid crystals, bringing the first and second glass sheets into contact, in particular by calendering or pressing, and
  optionally, before bringing the first and second glass sheets into contact, the formation of openings in the seal by the noncontinuous application of the sealant and/or by the continuous application of the sealant and the creation of breaks forming the openings.

The method can furthermore comprise the application of the additional sealant, forming a bridge between the lateral ends of the seal. The additional sealant can be made of said sealant, thus forming continuity of sealant, preferably made of epoxy resin.

According to a specific embodiment of the invention, the glazing can furthermore comprise an additional coating. This additional coating can be an opacifying coating, such as an opacifying paint, or another coating comprising a mirror layer. In this case, the additional coating is separated from the front face of the glazing at least by the coating comprising at least one mirror layer.

A better understanding of the invention will be obtained on reading the description which will follow, given solely by way of example and made with reference to the appended drawings, in which.

Figure 3:
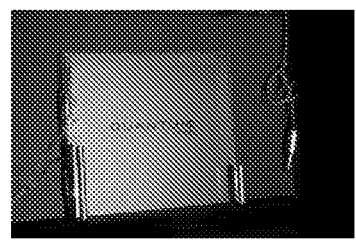
Figure 3:
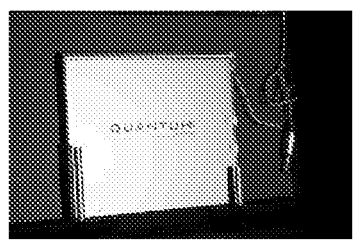
Figure 3:
Figure 3:
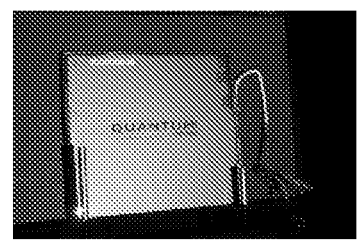
Figure 3:
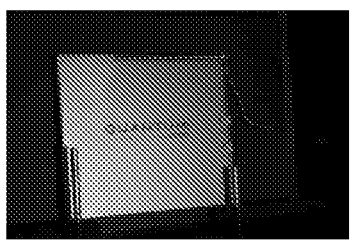
Figure 3:
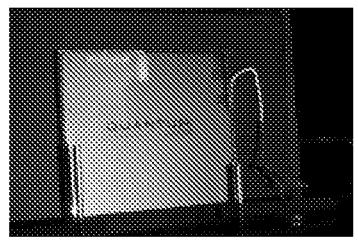
Figure 3:
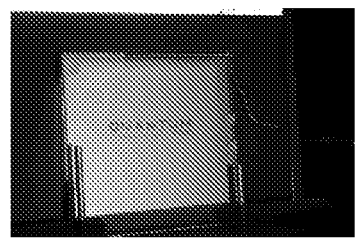
Figure 3:
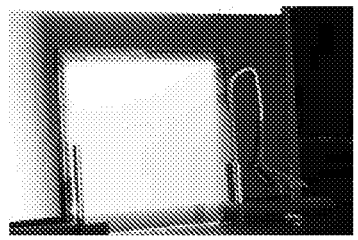

FIG. 3 comprises photographs.

The drawings are not to scale, for clear representation, as the differences in thickness between the layers having a glass function and the other layers are significant.

Figure 1:
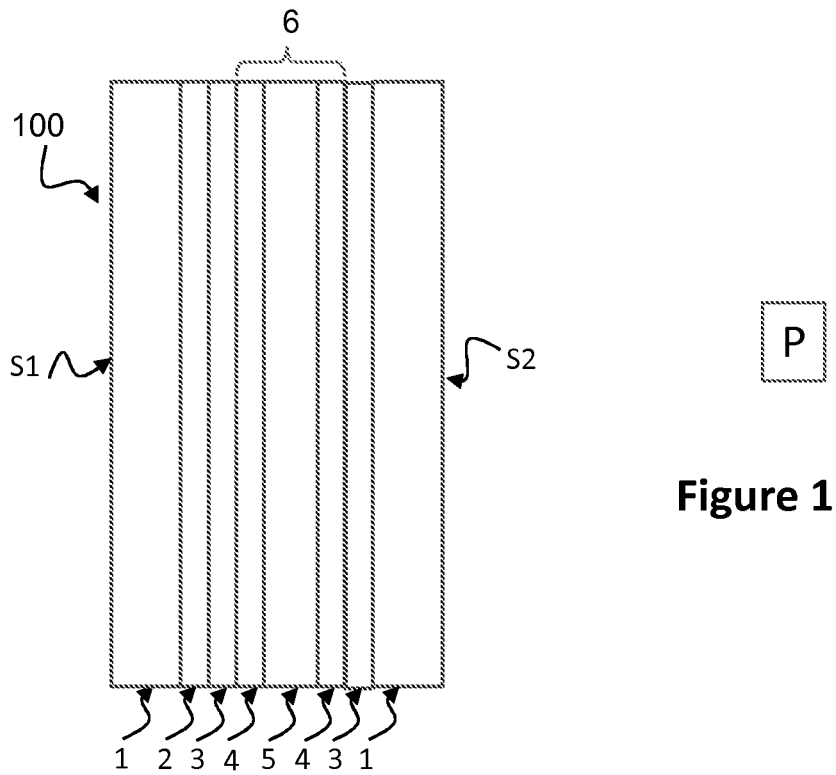
FIG. 1 is a diagrammatic transverse cross section of a projection system according to the invention comprising a projector and a glazing in accordance with an embodiment according to the invention.

FIG. 1 represents a projection system intended to operate in reflection comprising a projector P and a glazing 100. The glazing comprises an electrically controllable variable light scattering system 6 which can switch between a mirror state and a scattering state on the main external face or front face S2. As explained above, the glazing according to the invention exhibits the distinguishing feature of being able to be used as projection screen, i.e. for a spectator on the projector P side, rather than as back-projection screen, i.e. in which the projector is located behind the glazing.

In the "OFF" state, a scattering face is obtained on the front face S2 and a mirror face is obtained on the rear face S1 of the glazing. In the "ON" state, two mirror faces are obtained.

The glazing illustrated in FIG. 1 comprises:
  two front and rear substrates which are glass sheets 1,
  a mirror layer 2, which was deposited beforehand on the internal face of the sheet 1 or on the external face of the rear laminating insert 3,
  two plastic inserts 3,
  a variable light scattering system 6 comprising a functional film 5, capable of switching between a transparent state and a scattering state, framed by two electrode-carrying supports 4, said electrodes being directly in contact with the functional film.

According to this embodiment, the electrode-carrying supports are composed of a PET (polyethylene terephthalate) sheet covered with an electrically conducting layer of ITO (indium tin oxide) framing the functional film.

The laminating inserts make it possible to attach the front and rear substrates with the electrode-carrying supports.

Figure 2:
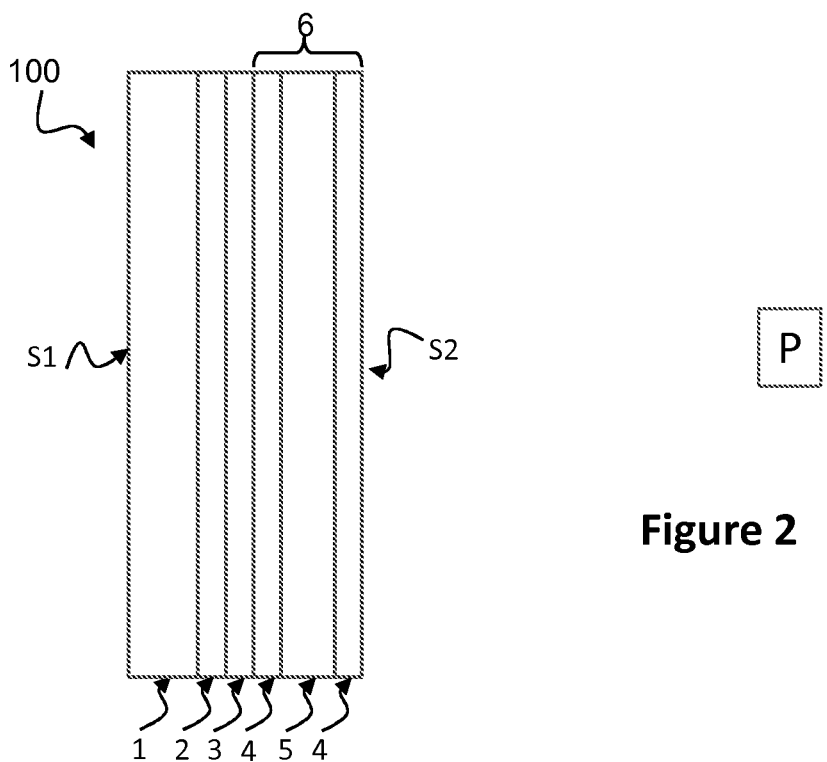
FIG. 2 is a diagrammatic transverse cross section of another projection system according to the invention comprising a projector and a glazing in accordance with an embodiment according to the invention.

FIG. 2 represents another projection system intended to operate in reflection comprising a projector P and a glazing 100.

The glazing illustrated in FIG. 2 comprises:
  a transparent rear substrate made of flat glass which is a glass sheet 1,
  a mirror layer 2, which was deposited beforehand on the internal face of the sheet 1 or on the external face of the rear laminating insert 3,
  a laminating insert 3,
  a variable light scattering system 6 comprising a functional film 5 framed by two electrode-carrying supports 4, said electrodes being directly in contact with the functional film.

According to this embodiment, the electrode-carrying supports are composed of two float glass sheets on which are deposited, on the internal faces, an electrically conducting layer with a thickness of approximately 20 to 400 nm made of indium tin oxide (ITO), for example. The ITO layers have a surface electrical resistance of between 5 $\Omega$/square and 300 $\Omega$/square. Instead of the layers made of ITO, it is also possible to use, for the same purpose, other layers of electrically conducting oxide or layers of silver having a comparable surface resistance.

The functional film 5 composed of a layer of liquid crystals can exhibit a thickness of approximately 5 to 60 µm. The layer of liquid crystals comprises spherical spacers. The spacers are composed of a hard transparent polymer. By way of example, the product from Sekisui Chemical Co. Ltd, known under the designation Micropearl SP®, has proved to be highly suitable as spacer. On the edge, the layer of liquid crystals is sealed by an adhesive seal (not represented)

which serves to connect the glass sheets 4 possessing the electrodes in a firm and permanent manner. The adhesive sealant which seals the separate glass sheets 4 over their edges comprises an epoxy resin.

In the initial stage ("OFF" state), that is to say before the application of an electric voltage, the functional film comprising liquid crystals is translucent, that is to say that it transmits optically but is not transparent. As soon as the current is turned on, the layer of liquid crystals changes, under the action of the alternating electric field, to the transparent state, that is to say that which makes possible viewing through the functional film.

The glazing can be produced by using a method described in detail below. Float glass sheets according to the invention are coated, in an industrial continuous coating plant, in successive chambers, using the magnetic-field assisted reactive cathode sputtering process, by sputtering with an ITO layer having an approximate thickness of 100 nm or with a layer of silver having a thickness of 70 nm.

Two separate glass sheets of equal size and exhibiting the desired dimensions are cut out from a large glass sheet coated in this way and are prepared for the continuation of the treatment.

The layer of liquid crystals, which is mixed with the spacers, is then applied to one of the two glass sheets thus treated. The application of the layer of liquid crystals can be carried out, during an operation known as filling, dropwise using a specific device which makes it possible to adjust with precision the amounts poured in. In another embodiment of the method, the application of the layer of liquid crystals can be carried out by virtue of a screen printing cloth exhibiting a defined mesh size.

The adhesive layer forming the seal is applied directly along the edge of the glass sheet before or after the removal of the layer of liquid crystals. The application of the sealant is noncontinuous or continuous and then followed by creation of the openings (by withdrawal of sealant).

When the two separate glass sheets are subsequently pushed against one another, the adhesive layer is compressed down to the thickness of the layer of liquid crystals.

The calendering and the pressing of the assembly thus formed is subsequently carried out. Optionally, if the layer of liquid crystals comprises a mixture of liquid crystals and monomers, a polymerization stage is then carried out, for example by irradiation with UV light if the monomers used are photopolymerizable.

The stack obtained is subsequently assembled with a substrate coated with a coating comprising a mirror layer. The assembling can be carried out mechanically, by adhesive bonding or by the use of a laminating insert.

The use of the glazing thus defined as projection screen operating in reflection makes it possible to improve the contrast and/or the luminosity and/or the angle of view.

The glazing according to the invention can be used in particular as internal partition between two rooms or in a space in a building. More particularly, the glazing of the invention is of particular use as internal partition of a meeting room for projecting presentations. It is possible to switch between the mirror state and the scattering state making possible the projection. Furthermore, the coating comprising the mirror layer prevents the projected image from appearing by transparency on the main face. This presents a considerable advantage when the projected images are confidential.

The glazing of the invention may also be of particular use in the hotel industry for separating a bathroom and a bedroom. A perfect mirror is obtained on the bathroom side.

In the bedroom, in the ON state, a mirror is obtained which structures the space between the bedroom and the bathroom and, in the OFF state, a projection screen, for example for the television, is obtained.

EXAMPLES

I. Materials Used

The variable scattering system (VSS1) comprises two polyethylene terephthalate sheets covered with an ITO layer acting as electrode framing the functional film, that is to say the medium comprising the droplets of liquid crystals. This variable scattering system is currently used in the Priva-Lite® glazings from Saint-Gobain Glass. The functional film comprising the liquid emulsion of nematic liquid crystals has a thickness of approximately 10 to 30 µm (preferably of 20 to 25 micrometers). The PET sheets have a thickness of approximately 175 µm. The two electrodes are composed of ITO (tin-doped indium oxide) with a resistance of approximately 100 ohms per square.

The variable light scattering system (VSS2) exhibits the configuration illustrated in FIG. 2 and comprises in particular two float glass sheets on which are deposited, on the internal faces, an electrically conducting layer with a thickness of approximately 20 to 400 nm made of indium tin oxide (ITO). The layer of liquid crystals has a thickness of 5 to 60 µm.

The variable scattering system (VSS3) comprises two float glass sheets. A coating comprising an electrically conducting mirror layer with a thickness of approximately 70 nm, made of silver, is deposited on the internal face of the float glass acting as rear electrode-carrying support. An electrically conducting layer with a thickness of approximately 20 to 400 nm, made of indium tin oxide (ITO), is also deposited on the internal face of the float glass acting as front electrode-carrying support. The layer of liquid crystals has a thickness of 5 to 60 µm.

Mention may be made, as additional front or rear substrates which can be used, of the Planilux® or Diamant® glasses sold by Saint-Gobain, which are flat glasses.

Laminating inserts made of EVA or PVB were also used.

Finally, three rear substrates composed of a glass sheet with a thickness of 6 mm comprising a coating comprising a mirror layer were also used. The characteristics of these substrates are given in the following table. The light reflection values $RE_{ext}$ and $LR_{int}$ correspond respectively to the measurement of the light reflection taken on the side of the glazing not comprising the mirror layer and on the side comprising the mirror layer.

| Characteristics | Layer of silver | Mirastar ® | Cool-Lite ® ST 120 |
|---|---|---|---|
| Esthetic appearance | Silver | Silver | Neutral |
| Nature of the mirror layer | Silver | Chromium | Niobium nitride |
| LT | >1 | 3 | 20 |
| $RE_{ext}$ % | >42 | — | 32 |
| $RL_{int}$ % (layer side) | >37 | 58 | 27 |
| $T_{UV}$ | <3 | — | 15 |

II. Examples of Glazings

The glazings of examples 1, 2, 3 and 5 comprise a variable scattering system VSS1 laminated by virtue of laminating inserts between a standard glass of Planilux® or Diamant® type and a mirror layer glass chosen from a Mirastar® glass, a glass comprising a layer of silver or a Cool-Lite® glass comprising an ST 120 layer.

Examples 4, 6 and 7 illustrate an embodiment comprising an active mixture of liquid crystals encapsulated between two glasses comprising conductive layers. In example 7, a metallic mirror layer is used as rear electrode of the variable light scattering system.

| Stack | Comparative example | Example 1 | Example 2 | Example 3 |
|---|---|---|---|---|
| Rear substrate | Yes | Yes | Yes | Yes |
| Mirror layer nature | No mirror layer | Mirastar® | Mirastar® | ST120 |
| Position of the mirror layer on the rear substrate: | | | | |
| external face | No | No | Yes | No |
| internal face | No | Yes | No | Yes |
| Insert | Yes | Yes | Yes | Yes |
| VSS | 1 | 1 | 1 | 1 |
| Insert | Yes | Yes | Yes | Yes |
| Front substrate | Yes | Yes | Yes | Yes |

| Stack | Example 4 | Example 5 | Example 6 | Example 7 |
|---|---|---|---|---|
| Rear substrate | Yes | Yes | Yes | No |
| Mirror layer nature | ST120 | Layer of Ag | Mirastar® | Layer of Ag |
| Position of the mirror layer on the rear substrate: | | | | |
| external face | No | No | No | No |
| internal face | Yes | Yes | Yes | No |
| Insert | Yes | Yes | Yes | No |
| VSS | 2 | 1 | 2 | 3 |
| Insert | No | Yes | No | No |
| Front substrate | No | Yes | No | No |

III. Gains and Angles of View of the Glazings

In a first step, the Bidirectional Reflectance Distribution Function (BRDF) of these different glazings was measured with a Reflet-90 goniophotometer of the Stil S.A. brand. This made it possible to calculate the characteristics, such as the gain and the angle of view of the projection screens on the scattering face (in the OFF state). The results obtained are summarized in the table below.

| | Gain | Angle of view (°) |
|---|---|---|
| Comparative example | 0.95 | 22 |
| Example 1 | 2.33 | 33 |
| Example 2 | 2.25 | 30 |
| Example 3 | 1 | 31 |
| Example 4 | 0.11 | 98 |

The glazing of the comparative example differs from the glazings of examples 1, 2 and 3 in that it does not comprise a mirror layer. The glazings of the invention used as projection screen exhibit an angle of view which is approximately 10° greater than the angle of view obtained with the glazings of the prior art.

The glazing of example 4, produced with a different configuration and in particular with a layer of liquid crystals, makes it possible to obtain greater values for angles of view.

IV. Analysis of the Contrast

In order to test the qualities of the projection screens of the invention when they are used as partition between two rooms, measurements of the contrast carried out under specific conditions of illumination were carried out. These tests make it possible to observe the influence on the contrast of the illumination in the projection room and in a related room.

In this test, when the projection room is not illuminated ("dark projector" condition), the mean illumination in the room is less than 2 lux.

In order to be placed under illumination conditions of bathroom type, a Datacolor TrueVue® 2 booth with a fluorescent tube positioned in the ceiling of the booth and emitting light close to the spectrum of the illuminant D65 was used. From one scattering glazing to the other, the measurement of luminance is always carried out at one and the same point of the image with a Konica-Minolta® LS-110 luminance meter. The image projection is carried out with a Canon® XEED SX80 video projector (luminosity, 3000 lumens, contrast 900:1).

The arrangement of the elements is as follows. The screens formed by the glazings are attached to the booth. The image is projected over 30 cm*30 cm of glazing. The video projector is located 1.5 m from the screen. The observers and the photographic apparatus are located 2 m from the screen.

The measurements of illumination in the projection room and in the booth used during these tests:
Bright room: greater than 200 lux,
Dark room: 1 to 2 lux,
Bright booth illuminant D65; floor measurement: 850 lux,
Bright booth illuminant D65; glazing face measurement: 650 lux.

The measurements of illumination were carried out 2 m from the active glazing on the projection room side:
with the dark projector, the illumination in the room is less than 2 lux,
with a white image projection, with dark projection room and booth, the illumination is of the order of 10 lux,
with a white image projection, with bright booth and dark projection room, the illumination in the projection room is of the order of 10 lux.

In this test, the light originating from the booth always has a low impact on that of the projection room. This result is observed even when use is made of projection screens with a mirror layer exhibiting a light transmission of approximately 20%, which thus transmit more light toward the projection room. The reason for this arises essentially from the fact that the booth simulating the bathroom is small in size (typically ~50 cm×50 cm×50 cm).

This test makes it possible to measure the contrast of the glazing as projection screen. The contrast is defined as the ratio of the luminance measured when the projector displays a white image (Lw) to the luminance measured when the projector displays a dark image (Lb).

The luminance measurements taken on the diffuse screens are given in the table below. In the case of the strongly illuminated environments, it can be seen that the glazing of example 1 is greatly superior in terms of contrast, in comparison with the glazings of the comparative example and with the glazings comprising a mirror layer exhibiting a light transmission of approximately 20% (example 3).

In this table, the term ON means that the light of the room, of the booth or the projector is switched on or the term OFF means that the light of the room, of the booth or the projector is switched off.

| Projector | Booth | Projection room | Luminance (cd/m$^2$) | C = Lw/Lb |
|---|---|---|---|---|
| Projection screen: Comparative example | | | | |
| OFF | ON | OFF | 76.5 | 12.4 |
| ON | ON | OFF | 948 | |
| ON | OFF | OFF | 857 | 519.4 |
| OFF | OFF | OFF | 1.65 | |
| OFF | ON | ON | 83.2 | 11.2 |
| ON | ON | ON | 935 | |
| ON | OFF | ON | 864 | 108.4 |
| OFF | OFF | ON | 7.97 | |
| Projection screen: Example 1 | | | | |
| OFF | ON | OFF | 9 | 327.8 |
| ON | ON | OFF | 2950 | |
| ON | OFF | OFF | 2960 | 518.4 |
| OFF | OFF | OFF | 5.71 | |
| OFF | ON | ON | 25.6 | 116.8 |
| ON | ON | ON | 2990 | |
| ON | OFF | ON | 2970 | 134.4 |
| OFF | OFF | ON | 22.1 | |
| Projection screen: Example 2 | | | | |
| OFF | ON | OFF | 7.92 | 337.1 |
| ON | ON | OFF | 2670 | |
| ON | OFF | OFF | 2670 | 507.6 |
| OFF | OFF | OFF | 5.26 | |
| OFF | ON | ON | 26.1 | 103.1 |
| ON | ON | ON | 2690 | |
| ON | OFF | ON | 2700 | 115.4 |
| OFF | OFF | ON | 23.4 | |
| Projection screen: Example 3 | | | | |
| OFF | ON | OFF | 20.6 | 66.0 |
| ON | ON | OFF | 1360 | |
| ON | OFF | OFF | 1340 | 515.4 |
| OFF | OFF | OFF | 2.6 | |
| OFF | ON | ON | 28.4 | 48.2 |
| ON | ON | ON | 1370 | |
| ON | OFF | ON | 1350 | 133.7 |
| OFF | OFF | ON | 10.1 | |
| Projection screen: Example 4 | | | | |
| OFF | ON | OFF | 25.9 | 10.4 |
| ON | ON | OFF | 269 | |
| ON | OFF | OFF | 244 | 488.0 |
| OFF | OFF | OFF | 0.5 | |
| OFF | ON | ON | 34.2 | 8.1 |
| ON | ON | ON | 277 | |
| ON | OFF | ON | 252 | 27.4 |
| OFF | OFF | ON | 9.19 | |

It is found that very good results are obtained for the examples of the invention. The contrast values show virtually no variation for examples 1 and 2.

Example 3 differs from example 1 essentially in that the mirror layer exhibits higher light transmission values. The contrast values are better for example 1. This shows that the lower the light transmission of the mirror layer, the lower the light transmission of the glazing, the better the contrast.

V. Visual Study of the Quality of the Screens

In order to show the superior quality of the glazings used as projection screen of the invention, a panel of 5 people visually assessed the luminosity and the readability when an image is projected onto the front face of the glazings. Each projected image evaluated by the panel has formed the subject of a photograph. These photographs have been combined in FIG. 3.

The panel assigned, for each image projected onto a glazing, an assessment indicator chosen from: "−" fair, "+" correct, "++" good, "+++" excellent. The glazings, evaluation condition and assessment of the panel, and also the reference to the corresponding photograph, are summarized in the table below.

The variable light scattering systems are in the scattering state. The room in which the projection is carried out is dark. In the table below, the terms ON and OFF respectively refer to the bright or dark state of the booth representing a related room.

| | | | | Quality of the screen | |
|---|---|---|---|---|---|
| Photo. | Glazing | Filter | State | luminosity | readability |
| A | Comparative example | No | OFF | − | ++ |
| B | Ex. 1 | No | OFF | +++ | +++ |
| C | Ex. 2 | No | OFF | +++ | + |
| D | Ex. 3 | No | OFF | ++ | +++ |
| F | Ex. 1 | Yes | OFF | +++ | +++ |
| G | Ex. 3 | Yes | OFF | +++ | ++ |
| H | Ex. 1 | Yes | ON | ++ | ++ |
| I | Ex. 3 | Yes | ON | − | ++ |

Photographs H and I were taken with the light of the booth switched on and the light of the room switched off. However, a filter was then used to prevent saturation of the photographic equipment.

Photographs A, B, C, D, F and G were taken with the light of the booth and the light of the room switched off. Photographs F and G were also taken with a filter in order to be able to carry out a comparison with photographs H and I.

Example 1 can be compared with example 2. These two glazings differ only in the position of the mirror layer. The mirror layer is located, for example 1, inside the glazing on the internal face of the rear substrate whereas, for example 2, the mirror layer is located on the external face of the rear substrate. In the OFF state, the projection of images onto the scattering face clearly shows that the best results are obtained when the mirror layer is located as close as possible to the functional film, that is to say, for example, with a mirror layer of Mirastar® type placed inside the glazing. This configuration provides both a good mirror state in the ON state and good quality of the projection screen in the OFF state.

Example 1 can also be compared with example 3. Example 3 differs from example 1 essentially in that the mirror layer exhibits higher light transmission values. The glazing of example 3 exhibits a light transmission value of 17.1%, whereas the glazing of example 1 exhibits a light transmission value of less than 3%. The comparison of photographs F, G, H and I confirms that better results are obtained with a glazing comprising a lower light transmission.

The invention claimed is:

1. A glazing comprising a front face and a rear face, wherein said glazing comprises:
   a variable light scattering system comprising a functional film that includes a liquid crystal material capable of switching between a transparent state and a scattering state,
   a coating comprising at least one mirror layer, wherein the mirror layer exhibits a thickness of between 50 and 80 nm, said coating being separated from the front face at least by the functional film, and said glazing exhibits:
   a light transmission LT of less than 20%,
   a light reflection LR of greater than 25%,
   wherein the light transmission LT and the light reflection LR are measured according to ISO 9050:2003 with an illuminant D65 and a 20 observer, and the light reflection LR is measured on the front face of said glazing with the liquid crystal material in the transparent state, and the light transmission LT is measured in at least one of the transparent state and the scattering state; and wherein the mirror layer is one of a metallic layer and a layer comprising a metal nitride that includes at least one metal chosen from the group consisting of silver, aluminum, titanium, gold, nickel, chromium, copper, rhodium, platinum, palladium, cobalt, manganese, molybdenum, tungsten, hafnium, niobium, iron and tantalum, including alloys of these.

2. The glazing as claimed in claim 1, wherein the variable light scattering system is electrically controllable and comprises the functional film framed by front and rear electrode-carrying supports, said electrode-carrying supports each comprising at least one electrically conducting layer and being directly in contact with the functional film.

3. The glazing as claimed in claim 2, wherein the mirror layer is the electrically conducting layer of the rear electrode-carrying support.

4. The glazing as claimed in claim 1, wherein at least one of the light transmission LT of said glazing is less than 5% and the light reflection LR of said glazing is greater than 50%.

5. The glazing as claimed in claim 1, wherein the mirror layer is chosen from the group consisting of a layer of silver, chromium, niobium, niobium nitride, and alloys predominately comprising silver, chromium, iron, or niobium.

6. The glazing as claimed in claim 1, wherein the mirror layer is positioned inside the glazing.

7. The glazing as claimed in claim 1, wherein the glazing comprises, in sequence:
a transparent rear substrate made of flat glass,
a plastic insert laminated to the transparent rear substrate made of flat glass,
the variable light scattering system comprising the functional film including the liquid crystal material, wherein the function film is framed by two electrode-carrying supports, said electrode-carrying supports each comprising an electrode that is directly in contact with the functional film,
a plastic insert laminated to a transparent front substrate made of flat glass, and
the transparent front substrate made of flat glass.

8. The glazing as claimed in claim 7, wherein the two electrode-carrying supports are each composed of a polyethylene terephthalate sheet covered with an electrically conducting layer of indium tin oxide providing the electrode that is in contact with the functional film.

9. The glazing as claimed in claim 7, wherein the coating comprising at least one mirror layer is deposited on at least one of:
an external face of the transparent rear substrate,
an internal face of the transparent rear substrate,
an external surface of a rear electrode-carrying support, and
an internal surface of the rear electrode-carrying support.

10. A method for projection in reflection according to which a projection screen operating in reflection and a projector are available, said method consisting in projecting images, by virtue of the projector, onto the projection screen, said projection screen comprising a glazing as defined in claim 7.

11. The glazing as claimed in claim 7, wherein the plastic insert laminated to the transparent rear substrate made of flat glass and the plastic insert laminated to a transparent front substrate made of flat glass each comprise a plastic selected from the group consisting of ethylene/vinyl acetate (EVA) copolymers and polyvinyl butyral (PVB).

12. The glazing as claimed in claim 1, wherein the glazing comprises:
a transparent rear substrate made of flat glass,
a plastic insert laminated to the transparent rear substrate made of flat glass, and
the variable light scattering system comprising the functional film that includes the liquid crystal material framed by two electrode-carrying supports, said electrode-carrying supports each comprising an electrode that is directly in contact with the functional film.

13. The glazing as claimed in claim 12, wherein the two electrode-carrying supports each comprise a flat float glass sheet.

14. The glazing as claimed in claim 1, wherein the mirror layer is chromium based.

15. The glazing as claimed in claim 1, further comprising at least one of an undercoat layer deposited under the mirror layer and an overcoat layer deposited over the mirror layer.

16. The glazing as claimed in claim 15, wherein the at least one of the undercoat layer and the overcoat layer has a thickness less than 150 nm.

17. A projection system comprising a glazing used as a projection screen and a projector, said glazing comprising a front face, onto which the image is projected, and a rear face, wherein: said glazing comprises:
a variable light scattering system comprising a functional film that includes a liquid crystal material capable of switching between a transparent state and a scattering state,
a coating comprising at least one mirror layer, wherein the mirror layer exhibits a thickness of between 50 and 80 nm, said coating being separated from the front face at least by the functional film, and said glazing exhibits:
a light transmission LT of less than 20%,
a light reflection LR of greater than 25%,
wherein the light transmission LT and the light reflection LR are measured according to ISO 9050:2003 with an illuminant D65 and a 20 observer, and the light reflection LR is measured on the front face of said glazing with the liquid crystal material in the transparent state, and the light transmission LT is measured in at least one of the transparent state or the scattering state; and
wherein the mirror layer is one of a metallic layer and a layer comprising a metal nitride that includes at least one metal chosen from the group consisting of silver, aluminum, titanium, gold, nickel, chromium, copper, rhodium, platinum, palladium, cobalt, manganese, molybdenum, tungsten, hafnium, niobium, iron and tantalum, including alloys of these.

* * * * *